(12) United States Patent
Shih (10) Patent No.: US 6,501,613 B1
(45) Date of Patent: Dec. 31, 2002

(54) GENERALIZED FOURIER SEEK METHOD AND APPARATUS FOR A HARD DISK DRIVE SERVOMECHANISM

(75) Inventor: Teng-Yuan Shih, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/552,112

(22) Filed: Apr. 19, 2000

Related U.S. Application Data (60) Provisional application No. 60/171,015, filed on Dec. 15, 1999.

(51) Int. Cl.[7] .............................................. G11B 5/596
(52) U.S. Cl. .................................... 360/78.06; 360/270
(58) Field of Search .......................... 360/78.07, 78.06, 360/69, 265.6, 270; 318/254, 561, 632; 700/251

(56) References Cited

U.S. PATENT DOCUMENTS

| | | | |
|---|---|---|---|
| 4,371,902 A | | 2/1983 | Baxter et al. |
| 4,539,662 A | | 9/1985 | Hatano et al. |
| 4,677,568 A | * | 6/1987 | Arbter ........................ 700/251 |
| 4,802,033 A | | 1/1989 | Chi |
| 4,811,135 A | | 3/1989 | Janz |
| 4,823,212 A | | 4/1989 | Knowles et al. |
| 4,890,172 A | | 12/1989 | Watt et al. |
| 4,937,689 A | | 6/1990 | Seaver et al. |
| 4,977,472 A | | 12/1990 | Volz et al. |
| 4,979,056 A | * | 12/1990 | Squires et al. ................. 360/69 |
| 4,982,295 A | | 1/1991 | Yakuwa et al. |
| 5,036,408 A | | 7/1991 | Leis et al. |
| 5,050,146 A | | 9/1991 | Richgels et al. |
| 5,053,899 A | | 10/1991 | Okawa et al. |
| 5,182,684 A | | 1/1993 | Thomas et al. |
| 5,210,662 A | | 5/1993 | Nishijima |
| 5,235,478 A | | 8/1993 | Hoshimi et al. |
| 5,255,136 A | | 10/1993 | Machado et al. |
| 5,291,110 A | | 3/1994 | Andrews, Jr. et al. |
| 5,333,140 A | | 7/1994 | Moraru et al. |
| 5,408,367 A | | 4/1995 | Emo |
| 5,448,429 A | | 9/1995 | Cribbs et al. |
| 5,450,249 A | | 9/1995 | Nagaraj et al. |

(List continued on next page.)

FOREIGN PATENT DOCUMENTS

| | | |
|---|---|---|
| EP | 0263962 A2 | 4/1988 |
| EP | 0441407 A1 | 8/1991 |
| EP | 0543654 A2 | 5/1993 |
| EP | 0 601 855 A3 | 6/1994 |
| EP | 0 663 766 A1 | 7/1995 |
| EP | 0 717 559 A2 | 6/1996 |
| EP | 0 718 827 A2 | 6/1996 |
| GB | 2 285 165 A | 6/1995 |
| GB | 2 307 089 A | 5/1997 |
| GB | 2 308 488 A | 6/1997 |
| GB | 2342492 A | 4/2000 |
| WO | WO 93/09480 | 10/1992 |
| WO | WO 95/24035 | 9/1995 |
| WO | WO 96/23305 | 8/1996 |

*Primary Examiner*—David Hudspeth
*Assistant Examiner*—Fred F. Tzeng
(74) *Attorney, Agent, or Firm*—Irell & Manella, LLP; Jeffrey P. Aiello (57) ABSTRACT

A method and apparatus for moving a transducer across a disk surface so that the transducer has a generalized Fourier series seek acceleration trajectory. In one embodiment, the generalized Fourier series seek acceleration trajectory includes tuned coefficients that are determined empirically. The generalized Fourier series seek trajectories provide improved performance and robustness of hard disk drive servomechanisms, resulting in shorter seek time. Additionally, the hard disk drive is more immune to external disturbances, and the acoustic noise caused by seeking is reduced. In one embodiment, the duration of acceleration and deceleration are equal. In another embodiment, the duration of acceleration and deceleration are unequal, resulting in more flexibility to decrease residual vibrations of mechanical components, and further reduction of seek time.

33 Claims, 5 Drawing Sheets

U.S. PATENT DOCUMENTS

| | | | |
|---|---|---|---|
| 5,452,285 A | 9/1995 | Monen | |
| 5,453,887 A | 9/1995 | Negishi et al. | |
| 5,465,034 A | 11/1995 | Andrews, Jr. et al. | |
| 5,465,035 A | 11/1995 | Scaramuzzo, Jr. et al. | |
| 5,475,545 A | * 12/1995 | Hampshire et al. | 360/78.06 |
| 5,500,776 A | 3/1996 | Smith | |
| 5,523,902 A | 6/1996 | Pederson | |
| 5,570,247 A | 10/1996 | Brown et al. | |
| 5,581,420 A | 12/1996 | Chainer et al. | |
| 5,583,712 A | * 12/1996 | Brunelle | 360/77.07 |
| 5,587,850 A | 12/1996 | Ton-that | |
| 5,600,506 A | 2/1997 | Baum et al. | |
| 5,606,469 A | 2/1997 | Kosugi et al. | |
| 5,608,587 A | 3/1997 | Smith | |
| 5,615,058 A | 3/1997 | Chainer et al. | |
| 5,631,783 A | 5/1997 | Park | |
| 5,640,423 A | 6/1997 | Archer | |
| 5,657,179 A | 8/1997 | McKenzie | |
| 5,659,436 A | 8/1997 | Yarmchuk et al. | |
| 5,666,238 A | 9/1997 | Igari et al. | |
| 5,666,242 A | * 9/1997 | Edwards et al. | 360/265.6 |
| 5,677,609 A | * 10/1997 | Khan et al. | 318/561 |
| 5,680,270 A | 10/1997 | Nakamura | |
| 5,680,451 A | 10/1997 | Betts et al. | |
| 5,691,857 A | 11/1997 | Fitzpatrick et al. | |
| 5,696,647 A | 12/1997 | Phan et al. | |
| 5,710,677 A | 1/1998 | Teng et al. | |
| 5,715,105 A | 2/1998 | Katayama et al. | |
| 5,734,680 A | 3/1998 | Moore et al. | |
| 5,748,677 A | 5/1998 | Kumar | |
| 5,751,513 A | 5/1998 | Phan et al. | |
| 5,760,992 A | 6/1998 | Phan et al. | |
| 5,771,126 A | 6/1998 | Choi | |
| 5,771,130 A | 6/1998 | Baker | |
| 5,771,131 A | 6/1998 | Pirzadeh | |
| 5,796,543 A | 8/1998 | Ton-That | |
| 5,798,883 A | 8/1998 | Kim | |
| 5,867,337 A | 2/1999 | Shimomura | |
| 5,867,353 A | 2/1999 | Valent | |
| 5,892,634 A | 4/1999 | Ito et al. | |
| 5,901,009 A | 5/1999 | Sri-Jayantha et al. | |
| 5,917,670 A | 6/1999 | Scaramuzzo et al. | |
| 5,930,067 A | 7/1999 | Andrews et al. | |
| 5,946,157 A | 8/1999 | Codilian et al. | |
| 5,959,952 A | 9/1999 | Wakuda | |
| 6,031,684 A | 2/2000 | Gregg | |
| 6,118,616 A | 9/2000 | Jeong | |
| 6,140,791 A | * 10/2000 | Zhang | 318/632 |
| 6,178,060 B1 | 1/2001 | Liu | |
| 6,225,767 B1 | * 5/2001 | Lovett et al. | 318/254 |

* cited by examiner

GENERIZED FOURIER SEEK PROFILE (THREE-TERM DESIGN)

NORMALIZED SEEK LENGTH

GENERIZED FOURIER SEEK PROFILE (EXTENDED DESIGN)

NORMALIZED SEEK LENGTH

GENERALIZED FOURIER SEEK METHOD AND APPARATUS FOR A HARD DISK DRIVE SERVOMECHANISM

CROSS-REFERENCE TO RELATED APPLICATION

The present application is a Non-Provisional Application of a Provisional Application entitled "GENERALIZED FOURIER SEEK METHOD FOR DESIGNING HARD DISK DRIVE SERVO MECHANISMS", assigned Provisional Application Ser. No. 60/171,015, and filed Dec. 15, 1999.

BACKGROUND OF THE INVENTION

1. Field of the Invention

The present invention relates generally to disk drives and more particularly to a method, apparatus, and computer readable program code for improving performance and robustness of hard disk drive servomechanisms.

2. Description of the Related Art

Hard disk drives include a plurality of magnetic transducers that can write and read information by magnetizing and sensing the magnetic field of a rotating disk(s), respectively. The information is typically formatted into a plurality of sectors that are located within an annular track. There are a number of tracks located across each surface of the disk. A number of vertically similar tracks are sometimes referred to as a cylinder. Each track may therefore be identified by a cylinder number.

Each transducer is typically integrated into a slider that is incorporated into a head gimbal assembly (HGA). Each HGA is attached to an actuator arm. The actuator arm has a voice coil located adjacent to a magnet assembly which together define a voice coil motor. The hard disk drive typically includes a driver circuit and a controller that provide current to excite the voice coil motor. The excited voice coil motor rotates the actuator arm and moves the transducers across the surfaces of the disk(s).

When writing or reading information the hard disk drive may perform a seek routine to move the transducers from one cylinder (track) to another cylinder. During the seek routine the voice coil motor is excited with a current to move the transducers to the new cylinder location on the disk surfaces. The controller also performs a servo routine to insure that the transducer is at the center of the track.

Many disk drives utilize a "bang-bang" control algorithm to move the transducer to the correct location in the shortest amount of time. The shape of the current waveform for seek routines that utilize bang-bang control theory is typically square. Unfortunately, square waveforms contain high frequency harmonics which stimulate mechanical resonance in the HGA and excite mechanical components or assemblies with high natural frequencies. This results in acoustic noise, and undesirable vibration and associated settling time due to residual vibration. The mechanical resonance created by the square waveforms of the prior art tend to increase both the settling and overall time required to write or read information from the disk.

It is desirable to minimize the amount of time required to write and read information from the disk(s). Therefore, the seek routine performed by the drive should move the transducers to the new cylinder location in the shortest amount of time. Additionally, the settling time of the HGA should be minimized so that the transducer can quickly write or read information, once located adjacent to the new cylinder.

Another seek technique is described in a co-pending application entitled "METHOD AND APPARATUS FOR REDUCING ACOUSTIC NOISE IN A HARD DISK DRIVE", application Ser. No. 09/167,884, filed Oct. 7, 1998, and assigned to the assignee of the present invention. The co-pending application describes a sinusoidal seek method that reduces acoustic noise in seeking.

BRIEF SUMMARY OF THE INVENTION

The present invention comprises a method, apparatus, and computer program product for a hard disk drive servomechanism. In one embodiment, the apparatus comprises a disk which has a surface, a spindle motor that rotates the disk, a transducer which can write information onto the disk and read information from the disk, and an actuator arm that can move the transducer across the surface of the disk. The apparatus further includes a controller that controls the actuator arm to move the transducer across the disk surface using a generalized Fourier series seek acceleration trajectory having one or more tuned coefficients.

DETAILED DESCRIPTION OF THE INVENTION

The present invention comprises a hard disk drive which moves a transducer across a disk surface using a generalized Fourier series seek acceleration trajectory where the generalized Fourier series seek includes one or more tuned coefficients that are determined empirically. The generalized Fourier series seek trajectory includes an acceleration mode and a deceleration mode.

The transducer may be integrated into a slider that is incorporated into a head gimbal assembly (HGA). The HGA may be mounted to an actuator arm which can move the transducer across the disk surface. The movement of the actuator arm and the transducer may be controlled by a controller. The controller may move the transducer from a present track to a new track in accordance with a seek routine and a servo control routine.

During the seek routine the controller moves the transducer in accordance with a generalized Fourier series seek acceleration trajectory. The acceleration trajectory includes an acceleration mode and a deceleration mode. In one embodiment, the duration of acceleration mode and deceleration mode are equal. The trajectory reduces the high harmonics found in square waveforms of the prior art, and minimize the mechanical resonance and thus the acoustic noise of the HGA. Reducing the acoustic noise of the HGA may reduce the settling time of the transducer for reducing the duration of the seek routine. Reducing the acoustic noise may also provide accurate positioning of the transducer relative to a desired track of the disk. In another embodiment, the duration of acceleration mode and deceleration mode are unequal which may provide flexibility in further decreasing residual vibrations of mechanical components, and reducing the seek time.

With the generalized Fourier series seek acceleration trajectory, the system is capable of a fast-seek servo close to the classical bang-bang control and its likes. Velocity tracking is used for position control robustness. The acceleration trajectory for seek can be compared with a Fourier sine series for classical bang-bang control with some differences. First, only a few sine terms are needed. Second, the coefficients for sine functions are not obtained from the ordinary Fourier sine series for a square wave, but are tuned for optimal performance. The velocity and position trajectories for seek are generated based on the generalized Fourier acceleration trajectory.

Figure 1:
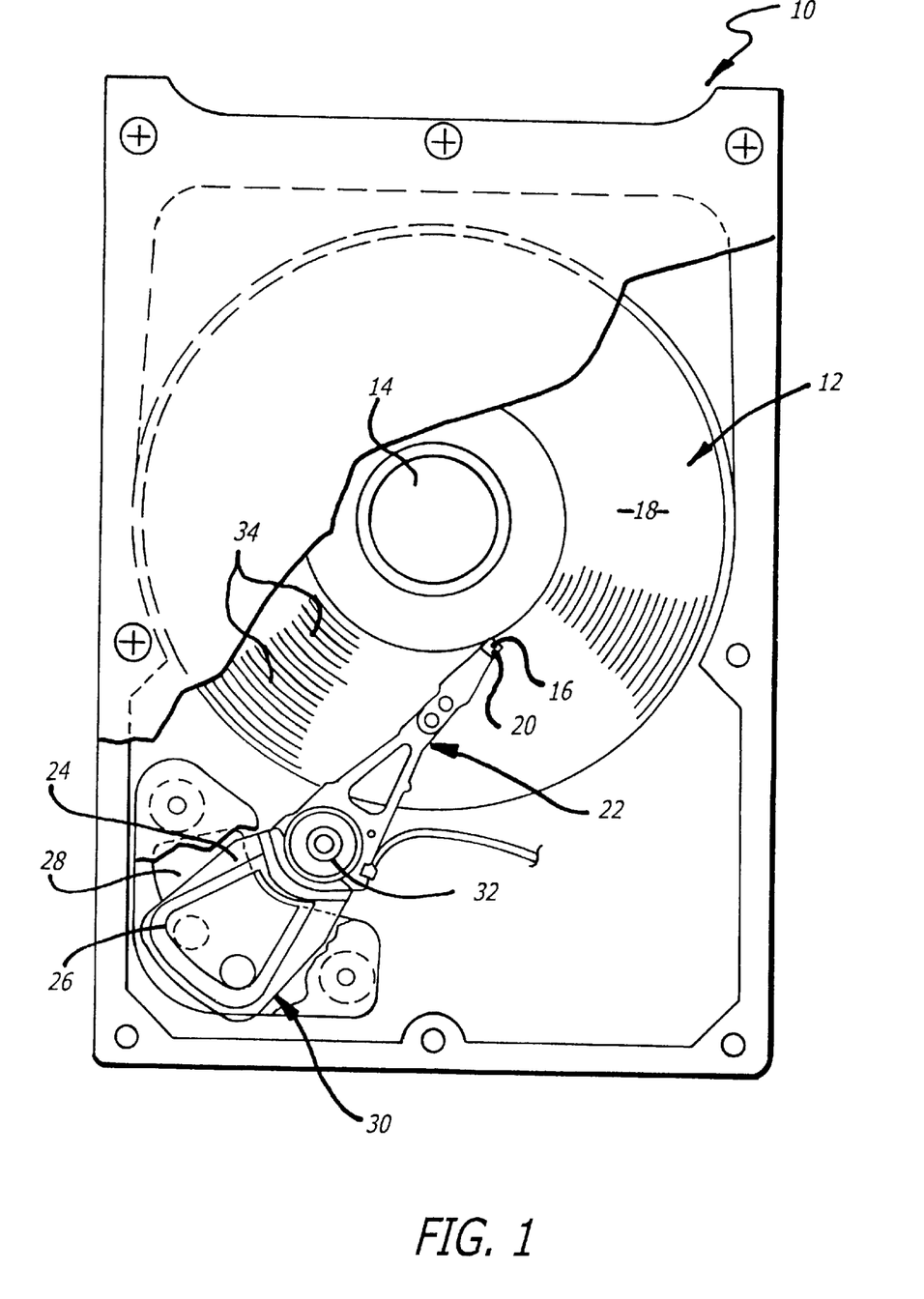
FIG. 1 is a top view of an embodiment of a hard disk drive of the present invention.

Referring to the drawings more particularly by reference numbers, FIG. 1 shows an embodiment of a hard disk drive 10. The drive 10 includes at least one magnetic disk 12 that is rotated by a spindle motor 14. The drive 10 may also include a transducer 16 located adjacent to a disk surface 18.

The transducer 16 can write and read information on the rotating disk 12 by magnetizing and sensing the magnetic field of the disk 12, respectively. There is typically a transducer 16 associated with each disk surface 18. Although a single transducer 16 is shown and described, it is to be understood that there may be a write transducer for magnetizing the disk 12 and a separate read transducer for sensing the magnetic field of the disk 12. The read transducer may be constructed from a magneto-resistive (MR) material.

The transducer 16 can be integrated into a slider 20. The slider 20 may be constructed to create an air bearing between the transducer 16 and the disk surface 18. The slider 20 may be incorporated into a head gimbal assembly (HGA) 22. The HGA 22 may be attached to an actuator arm 24 which has a voice coil 26. The voice coil 26 may be located adjacent to a magnet assembly 28 to define a voice coil motor (VCM) 30. Providing a current to the voice coil 26 will generate a torque that rotates the actuator arm 24 about a bearing assembly 32. Rotation of the actuator arm 24 will move the transducer 16 across the disk surface 18.

Information is typically stored within annular tracks 34 of the disk 12. Each track 34 typically contains a plurality of sectors. Each sector may include a data field and an identification field. The identification field may contain Gray code information which identifies the sector and track (cylinder). The transducer 16 is moved across the disk surface 18 to write or read information on a different track. Moving the transducer to access a different track is commonly referred to as a seek routine.

Figure 2:
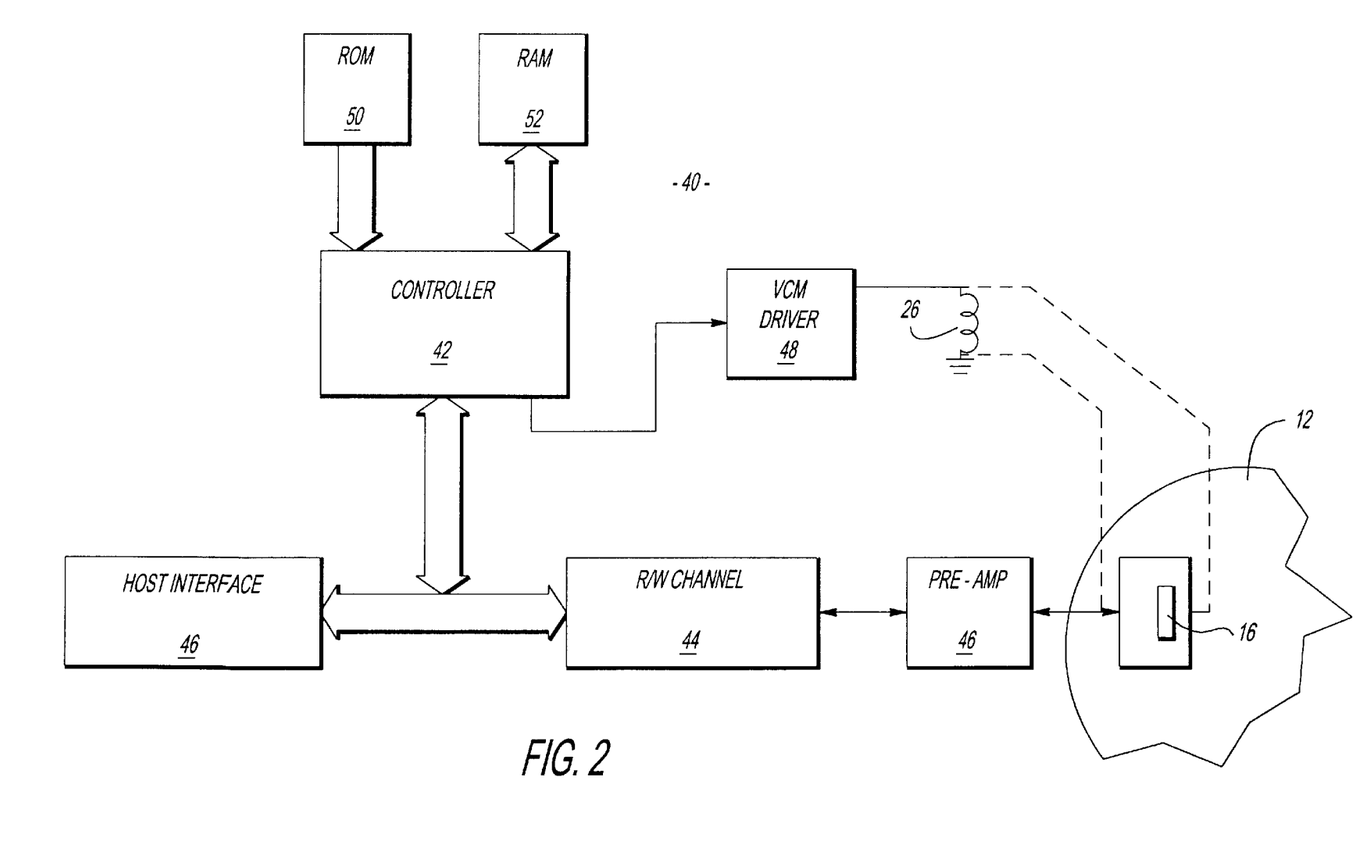
FIG. 2 is a schematic of an electrical system which controls the hard disk drive.

FIG. 2 shows an electrical system 40 which can control the hard disk drive 10. The system 40 may include a controller 42 that is coupled to the transducer 16 by a read/write (R/W) channel circuit 44 and a pre-amplifier circuit 46. The controller 42 may be a digital signal processor (DSP), microprocessor, microcontroller, and the like. The controller 42 can provide control signals to the read/write channel 44 to read from the disk 12 or write information to the disk 12. The information is typically transferred from the R/W channel 44 to a host interface circuit 46. The host circuit 46 may include buffer memory and control circuitry which allow the disk drive to interface with a system such as a personal computer.

The controller 42 may also be coupled to a VCM driver circuit 48 which provides a driving current to the voice coil 26. The controller 42 may provide control signals to the driver circuit 48 to control the excitation of the VCM and the movement of the transducer 16.

The controller 42 may be connected to a non-volatile memory such as a read only memory (ROM) or flash memory device 50, and a random access memory (RAM) device 52. The memory devices 50 and 52 may contain instructions and data that are used by the controller 42 to perform software routines. One of the software routines may be a seek routine to move the transducer 16 from one track to another track. The seek routine may include a servo control routine to insure that the transducer 16 moves to the correct track. In one embodiment, the memory device 50 contains the acceleration, velocity, and position trajectory equations of the present invention, as discussed hereinbelow, where such equations may be loaded into memory device 52 at startup.

Figure 3:
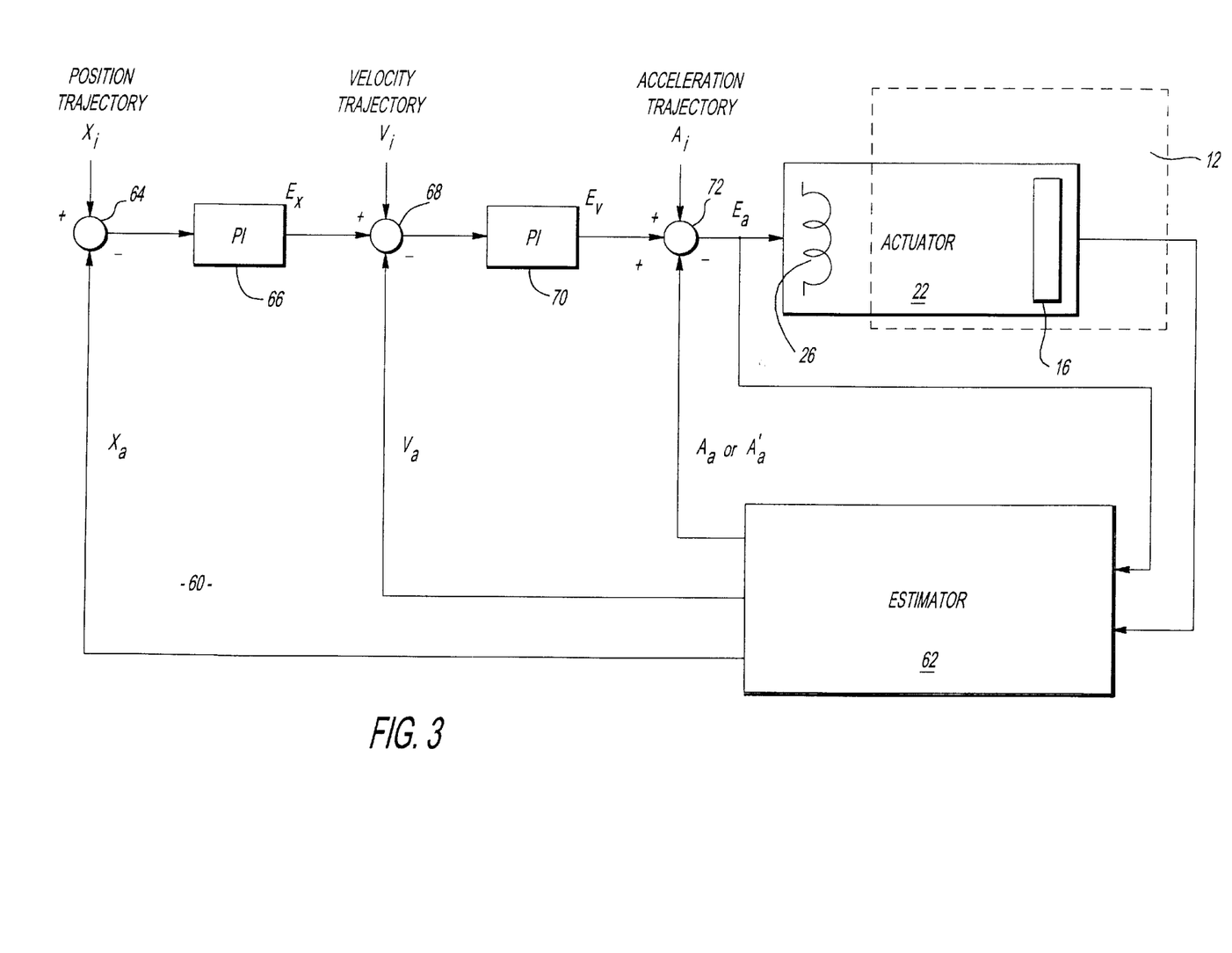
FIG. 3 is a schematic of a servo control system of the disk drive.

FIG. 3 shows a servo control system 60 that is implemented by the controller 42, which may be implemented in hardware and/or software. The servo control system 60 insures that the transducer 16 is accurately located on a desired track of the disk 12. When the controller 42 performs a seek routine the transducer 16 is moved from a first track to a new track located a distance $X_{SK}$ from the first track. The Gray codes of one or more tracks located between the new and first tracks are read as the transducer 16 moves across the disk 16. This allows the controller 42 to periodically determine whether the transducer 16 is moving at a desired speed or acceleration, or both, across the disk surface.

The control system 60 includes an estimator 62, which may be implemented in software and/or hardware. The estimator 62 can determine the actual distance or position $X_a$ that the transducer has moved from the first track. The position can be determined by reading the Gray code of a track beneath the transducer 16. The estimator 62 can also determine the actual velocity $V_a$ and actual acceleration $A_a$ of the transducer 16. The Gray codes can be periodically sampled as the transducer 16 moves to the new track location so that the controller 42 can correct the movement of the transducer 16 with the control 60.

The controller 42 computes a design position $X_i$, a design velocity $X_i$ and a design acceleration $A_i$ of the transducer 16 each time the transducer reads the Gray code of a track 34. The controller 42 computes the difference between the design position $X_i$ and the actual position $X_a$ at summing junction 64. In block 66 the controller 42 then computes a position correction value $E_x$ with a proportional plus integral control algorithm and the output of the summing junction 64.

The actual velocity $V_a$ is subtracted from the sum of the design velocity $V_i$ and the position correction value $E_x$ at summing junction 68. In block 70 the controller 42 computes a velocity correction value $E_v$ with a proportional plus integral control algorithm and the output of the summing junction 68.

An acceleration correction value $E_a$ is computed by subtracting the actual acceleration $A_a$ from the sum of the design acceleration $A_i$ and the velocity correction value $E_v$ at summing junction 72. The acceleration correction value $E_a$ is used to increase or decrease the current provided to the voice coil 26 and to vary the acceleration of the movement of the transducer 16.

The acceleration correction value $E_a$ may also be provided to the estimator 62 to generate a feedforward acceleration value $A_a$. The feedforward acceleration value $A_a$ can be provided to summing junction 72 to provide a feedforward control loop.

The design acceleration, velocity, and position waveforms provided at the respective summing junction 72, 68, and 64 are described and shown hereinbelow.

For a standard Fourier series, the number of functions in a finite sum has to be fairly large to minimize the oscillatory pattern in the resulting function. Even with the inclusion of a very large number of finite terms, the resulting curve still shows oscillation near discontinuity points. When only a few terms are used, the varying amplitude of oscillation is very large, and is not restricted to the discontinuity points. This well-known phenomenon of the Fourier series is called Gibbs phenomenon.

The seek algorithm of the present invention uses a generalized Fourier series having a finite number of sinusoidal functions, but uses tuned coefficients that replace the constant coefficients derived from conventional Fourier series. In one embodiment, the tuned coefficients are determined empirically to provide well-behaved generalized Fourier seek trajectories. The acceleration trajectory of the present invention for seek is of the following form:

$$a(t) = \alpha K_T I_M \left[ \sin\left(\frac{2\pi}{T_{SK}}t\right) + \frac{F_3}{3}\sin\left(\frac{2\pi}{T_{SK}}3t\right) + \frac{F_5}{5}\sin\left(\frac{2\pi}{T_{SK}}5t\right) \right] \quad (1)$$

where, $K_A$=acceleration constant;

$I_M$=maximum current provided to the voice coil;

$T_{SK}$=seek time required to move the transducer from one track to another track;

$F_3$ and $F_5$=tuned coefficients determined empirically; and the constant parameter $\alpha$ is the normalization constant, and is defined as:

$$\alpha = \left\{ \max_{0<t<T_{SK}} \left[ \sin\left(\frac{2\pi}{T_{SK}}t\right) + \frac{F_3}{3}\sin\left(\frac{2\pi}{T_{SK}}3t\right) + \frac{F_5}{5}\sin\left(\frac{2\pi}{T_{SK}}5t\right) \right] \right\}^{-1}. \quad (2)$$

It is to be noted that the acceleration trajectory equation (1) includes three terms, though the acceleration trajectory may include any number of terms (e.g., two, four, etc.).

The velocity trajectory equation and the position trajectory equation can be derived by respectively integrating the acceleration trajectory equation (1) and the velocity trajectory equation, yielding:

$$v(t) = \alpha K_T I_M \frac{T_{SK}}{2\pi} \quad (3)$$
$$\left\{ \left[1 - \cos\left(\frac{2\pi}{T_{SK}}t\right)\right] + \frac{F_3}{3^2}\left[1 - \cos\left(\frac{2\pi}{T_{SK}}3t\right)\right] + \frac{F_5}{5^2}\left[1 - \cos\left(\frac{2\pi}{T_{SK}}5t\right)\right] \right\}$$

and, $$x(t) = \quad (4)$$
$$\alpha K_T I_M \frac{T_{SK}}{2\pi} \left\{ \begin{array}{l} \left[t - \frac{T_{SK}}{2\pi}\sin\left(\frac{2\pi}{T_{SK}}t\right)\right] + \frac{F_3}{3^2}\left[t - \frac{T_{SK}}{6\pi}\sin\left(\frac{2\pi}{T_{SK}}3t\right)\right] + \ldots \\ \frac{F_5}{5^2}\left[t - \frac{T_{SK}}{10\pi}\sin\left(\frac{2\pi}{T_{SK}}5t\right)\right] \end{array} \right\}.$$

When the disk drive is in operation, the disk drive may receive a command to store or read information. The command may require that the transducer be moved from any track to any other track in accordance with a seek routine. During a seek routine, the new track and corresponding distance (seek length $X_{SK}$) to the new track from the first track can be determined by the controller 42. The seek time $T_{SK}$ may be initially computed before the acceleration, velocity, and position trajectory equations (1), (3), and (4) are computed. The following relationship between $T_{SK}$ and $X_{SK}$ can be derived from equation (4) by setting $t=T_{SK}$.

$$X_{SK} = \frac{\beta}{2\pi} K_T I_M T_{SK}^2 \quad (5)$$

where $$\beta = \alpha \gamma \quad (6)$$

and $$\gamma = 1 + \frac{F_3}{3^2} + \frac{F_5}{5^2}. \quad (7)$$

Solving for $T_{SK}$, equation (5) becomes $$T_{SK} = \frac{1}{\sqrt{\beta}} \sqrt{\frac{2\pi X_{SK}}{K_T I_M}}. \quad (8)$$

The seek time, therefore, is proportional to the square root of seek length. The parameter $\beta$ is greater than or equal to one. Based on the velocity trajectory equation (3), the maximum velocity for seeking is reached when $t=T_{SK}/2$, yielding:

$$V_{MAX} = 2\alpha\gamma\left(\frac{1}{2\pi}K_T I_M T_{SK}\right). \quad (9)$$

As equation (9) shows, the maximum velocity is a function of seek time.

During the servo routine, the system may take a number of samples which correlate to the different positions, velocities, and accelerations of the transducer as the transducer moves from one track to another track. It is desirable to discretize the trajectory equations to correspond with the sampling of Gray codes so that the actual values can be subtracted from the design values at the summing junctions of the servo control shown in FIG. 3. To discretize the trajectories, equations (1), (3), and (4) are transformed into a sample domain (n), equation (8) is substituted into the amplitude terms, and $T_{SK}$ is set to $N_{SK}$ to generate the following equations:

$$a(n) = \frac{2\pi X_{SK}}{\gamma N_{SK}^2 T_S^2}\left[\sin\left(\frac{2\pi}{N_{SK}}n\right) + \frac{F_3}{3}\sin\left(\frac{2\pi}{N_{SK}}3n\right) + \frac{F_5}{5}\sin\left(\frac{2\pi}{N_{SK}}5n\right)\right], \quad (10)$$

$$v(n) = \frac{X_{SK}}{\gamma N_{SK}T_S}\left\{\left[1 - \cos\left(\frac{2\pi}{N_{SK}}n\right)\right] + \frac{F_3}{3^2}\left[1 - \cos\left(\frac{2\pi}{N_{SK}}3n\right)\right] + \frac{F_5}{5^2}\left[1 - \cos\left(\frac{2\pi}{N_{SK}}5n\right)\right]\right\}, \text{ and} \quad (11)$$

$$x(n) = \frac{X_{SK}}{\gamma N_{SK}T_S}\left\{\begin{array}{l}\left[nT_S - \frac{N_{SK}T_S}{2\pi}\sin\left(\frac{2\pi}{N_{SK}}n\right)\right] + \\ \frac{F_3}{3^2}\left[nT_S - \frac{N_{SK}T_S}{6\pi}\sin\left(\frac{2\pi}{N_{SK}}3n\right)\right] + \ldots \\ \frac{F_5}{5^2}\left[nT_S - \frac{N_{SK}T_S}{10\pi}\sin\left(\frac{2\pi}{N_{SK}}5n\right)\right]\end{array}\right\} \quad (12)$$

where, $T_S$=the sampling time for a digital servo, $N_{SK}$=the total number of samples, n=sample number.

Figure 4:
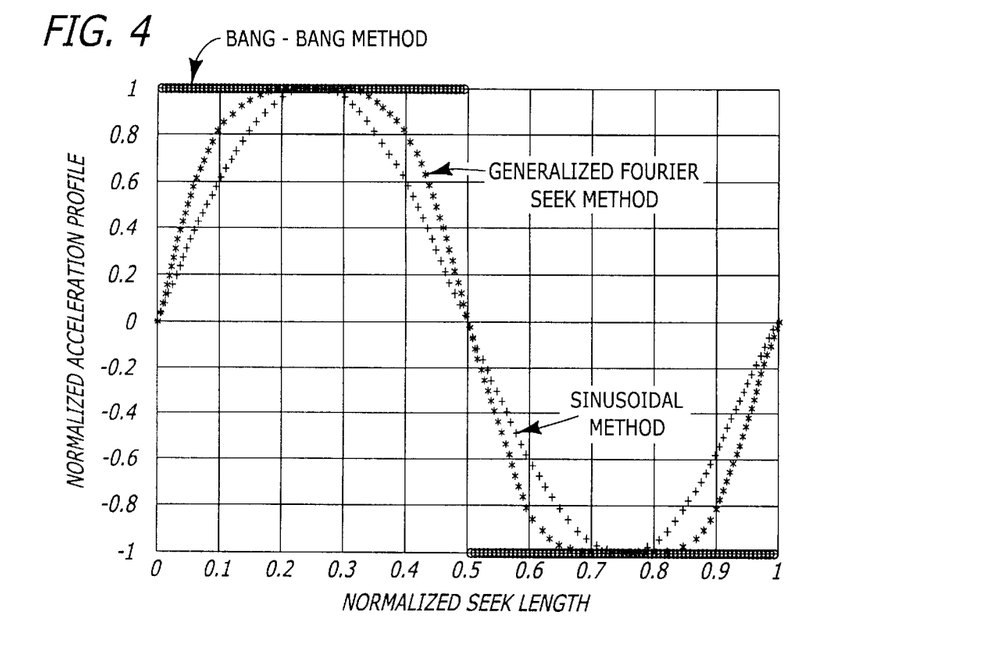
FIG. 4 shows a graph of an acceleration trajectory for bang-bang method, sinusoidal seek method, and the generalized Fourier seek method of the present invention.

FIG. 4 shows a graph of an acceleration trajectory for bang-bang method, sinusoidal seek method, as described in the co-pending application (application Ser. No. 09/167,884), and the generalized Fourier seek method of the present invention. As can be seen, the generalized Fourier seek method provides faster rise and fall times than the sinusoidal seek method. Additionally, the trajectory profile of the generalized Fourier seek method at the top and bottom portions are flat and smooth without any oscillations. Consequently, the generalized Fourier seek method offers better performance and flexibility.

For disk drive applications, head velocity is not to exceed a design maximum value $V_{MAX}$ to assure accurate reading of Gray codes. When the actual velocity of the read/write head is close to the maximum design velocity, the current input to the voice coil motor (VCM) diminishes. In a coarse model for seeking, the seek typically includes acceleration mode and deceleration mode for short to medium seeks, with an additional coast mode for long seeks when the actuator is cruising at constant maximum design speed.

In the following equations, the superscript M is used to denote seek period for acceleration mode and deceleration mode, but excludes coast mode (when the current input is zero, and velocity is set at the maximum design value). The seek time and seek length in terms of the maximum velocity using equations (5) and (9) are written as follows:

$$T_{SK}^M = \frac{\pi V_{MAX}}{\alpha \gamma K_T I_M} \quad (13)$$

and $$X_{SK}^M = \frac{\pi}{2\alpha \gamma K_T I_M}V_{MAX}^2. \quad (14)$$

The expressions of seek length and seek time for coast mode are, therefore, as follows:

$$X_{CST} = X_{SK} - X_{SK}^M \quad (15)$$

and $$T_{CST} = \frac{X_{CST}}{V_{MAX}} = \frac{X_{SK} - X_{SK}^M}{V_{MAX}}. \quad (16)$$

In the special case for seeking control where the duration of acceleration mode is the same as the duration for deceleration mode, the seek length for the acceleration mode and the deceleration mode are $$X_{ACC} = \frac{X_{SK} - X_{CST}}{2} \quad (17)$$

and $$X_{DEC} = X_{SK} - X_{ACC} - X_{CST} \quad (18)$$

Consequently, the discrete trajectory equations with the generalization to include coast mode for digital signal processor implementation are as follows:

$$a(n) = \frac{4\pi X_{DEC}}{\gamma N_{SK}^{M^2} T_S^2}\left\{\begin{array}{l}\sin\left[\frac{2\pi}{N_{SK}^M}(n - N_{CST})\right] + \\ \frac{F_3}{3}\sin\left[\frac{2\pi}{N_{SK}^M}3(n - N_{CST})\right] + \ldots \\ \frac{F_5}{5}\sin\left[\frac{2\pi}{N_{SK}^M}5(n - N_{CST})\right]\end{array}\right\}, \quad (19)$$

$$v(n) = \frac{2X_{DEC}}{\gamma N_{SK}^M T_S}\left\{\begin{array}{l}\left[1 - \cos\left(\frac{2\pi}{N_{SK}^M}(n - N_{CST})\right)\right] + \\ \frac{F_3}{3^2}\left[1 - \cos\left(\frac{2\pi}{N_{SK}^M}3(n - N_{CST})\right)\right] + \ldots \\ \frac{F_5}{5^2}\left[1 - \cos\left(\frac{2\pi}{N_{SK}^M}5(n - N_{CST})\right)\right]\end{array}\right\}, \text{ and} \quad (20)$$

$$x(n) = X_{ACC} + X_{CST} + \frac{2X_{DEC}}{N_{SK}^M}(X_{1n} + X_{2n} + X_{3n}) \quad (21)$$

where $$X_{1n} = \left\{\left(n - N_{CST} - \frac{N_{SK}^M}{2}\right) - \frac{N_{SK}^M}{2\pi}\sin\left[\frac{2\pi}{N_{SK}^M}(n - N_{CST})\right]\right\}, \quad (22)$$

$$X_{2n} = \frac{F_3}{3^2}\left\{\left(n - N_{CST} - \frac{N_{SK}^M}{2}\right) - \frac{N_{SK}^M}{6\pi}\sin\left[\frac{2\pi}{N_{SK}^M}3(n - N_{CST})\right]\right\}, \text{ and}$$

$$X_{3n} = \frac{F_2}{5^2}\left\{\left(n - N_{CST} - \frac{N_{SK}^M}{2}\right) - \frac{N_{SK}^M}{10\pi}\sin\left[\frac{2\pi}{N_{SK}^M}5(n - N_{CST})\right]\right\},$$

and N starts from 1.

During the servo routine the controller computes the design position, design velocity and design acceleration of the transducer at a first sample time, determines the actual position, velocity and acceleration values and then processes the data in accordance with the control loop shown in FIG. 3. Second, third, etc. samples are taken and the process is repeated to provide a servo routine that controls the movement of the transducer.

Digital Signal Processor Implementation

As discussed above, for a given seek length, the required seek time is proportional to the square root of the seek length. The implementation of square root in a digital signal processor is tedious. To simplify the seek time and seek length calculations, the controller can compute $T_{SK}$ and $X_{SK}$ by generating a number of sampling points N between t=0 and t=$T_{SK}$, and storing the values in memory (e.g., non-volatile memory). The seek time for any arbitrary seek length not stored in memory may be extracted by using linear interpolation using the following equation:

$$T_{SK} = T_{SK}^l + \frac{T_{SK}^{l+1} - T_{SK}^l}{X_{SK}^{l+1} - X_{SK}^l}(X_{SK} - X_{SK}^l). \quad (23)$$

For such a seek-time versus seek-length curve, the number of points computed and stored in memory should be denser for short seek lengths. To minimize the usage of memory, two well-known trigonometric identities are used as follows:

$$\cos\left(\frac{2\pi}{N_{SK}}(n+1)\right) = \cos\left(\frac{2\pi}{N_{SK}}\right)\cos\left(\frac{2\pi}{N_{SK}}n\right) - \sin\left(\frac{2\pi}{N_{SK}}\right)\sin\left(\frac{2\pi}{N_{SK}}n\right), \text{ and} \quad (24)$$

$$\sin\left(\frac{2\pi}{N_{SK}}(n+1)\right) = \sin\left(\frac{2\pi}{N_{SK}}\right)\cos\left(\frac{2\pi}{N_{SK}}n\right) - \cos\left(\frac{2\pi}{N_{SK}}\right)\sin\left(\frac{2\pi}{N_{SK}}n\right). \quad (25)$$

Using equations (24) and (25), two memory locations are used for each seek length, namely, $$\left\{\sin\left(\frac{2\pi}{N_{SK}}\right), \cos\left(\frac{2\pi}{N_{SK}}\right)\right\}. \quad (26)$$

For a seek length exceeding the limit seek length, the sine function is practically zero, while the cosine function is practically unity.

Let the cosine and sine states for the first sample (i) be defined and denoted as follows:

$$X_C(1) = X_{CI} = \cos\left(\frac{2\pi}{N_{SK}}\right), \text{ and} \quad (27)$$

$$X_S(1) = X_{SI} = \sin\left(\frac{2\pi}{N_{SK}}\right). \quad (28)$$

For any sample number i, the cosine and sine states are defined and denoted as follows:

$$X_C(i) = X_{Ci} = \cos\left(\frac{2\pi}{N_{SK}}i\right), \text{ and} \quad (29)$$

$$X_S(i) = X_{Si} = \sin\left(\frac{2\pi}{N_{SK}}i\right). \quad (30)$$

Using the identities in equations (24) and (25), the cosine and sine states for the second sample is expressed as follows:

$$X_{C2} = \cos\left(\frac{4\pi}{N_{SK}}\right) = 2X_C^2(1) - 1, \text{ and} \quad (31)$$

$$X_{S2} = \sin\left(\frac{4\pi}{N_{SK}}\right) = 2X_C(1)X_S(1), \text{ and} \quad (32)$$

$$X_{C3} = \cos\left(\frac{6\pi}{N_{SK}}\right) = 4X_C^3(1) - 3X_C(1), \text{ and} \quad (33)$$

$$X_{S3} = \sin\left(\frac{6\pi}{N_{SK}}\right) = 3X_S(1) - 4X_S^3(1). \quad (34)$$

The cosine and sine states for higher sample numbers are derived using the identity $$\begin{Bmatrix} X_{Ci}(n+1) \\ X_{Si}(n+1) \end{Bmatrix} = \begin{bmatrix} X_{Ci}(1) & -X_{Si}(1) \\ X_{Si}(1) & X_{Ci}(1) \end{bmatrix} \begin{Bmatrix} X_{Ci}(n) \\ X_{Si}(n) \end{Bmatrix} \quad (35)$$

i=1,2,3, ..., and
n=1,2,3, ....

$$\begin{Bmatrix} X_{Ci}(0) \\ X_{Si}(0) \end{Bmatrix} = \begin{Bmatrix} M \\ 0 \end{Bmatrix} \quad (36)$$

M is the value of cos(0) which is unity. In one embodiment, a 14-bit number is used to represent cosine and sine states. In such an embodiment, M is set to 16,384. It is to be appreciated that a number having any number of bits may be used to represent cosine and sine states.

At the beginning of seek, the initial sine and cosine parameters are read from memory. The initial values of higher order terms (e.g., i=2 and i=3), are computed using equations (31)–(34) or the general equation (35). The sine and cosine states for higher order samples (e.g., n=2, 3, ... ) are updated. The updating of sine and cosine states of such higher order samples involves multiplication, addition, and subtraction, which are simple calculations using a digital signal processor or other microprocessor.

Two examples are presented to show the advantage of the generalized Fourier seek method and apparatus of the present invention. In the first example, a two-term generalized Fourier seek method is utilized, and in the second example a three-term generalized Fourier seek method is utilized. In the two-term method, a single tuned coefficient $F_3$ is selected for optimal performance. In the three-term method, two tuned coefficients $F_3$ and $F_5$ are selected for optimal performance. In one embodiment, the coefficients are selected empirically. These tuned coefficients are shown in Table 1.

TABLE 1

|  | $F_3$ | $F_5$ |
| --- | --- | --- |
| 2-term design | 0.3750 | N/A |
| 3-term design | 0.6204 | 0.1974 |

Table 2 shows the values of other parameters based on the tuned coefficients shown in Table 1, for determining acceleration, velocity, and position trajectories.

TABLE 2

|  | 2-term design | 3-term design |
| --- | --- | --- |
| α | 1.1395 | 1.2031 |
| β | 1.1870 | 1.2917 |
| γ | 1.0417 | 1.0737 |
| 2αγ | 2.3739 | 2.5835 |
| 1/√β | 0.9179 | 0.8799 |

Figure 5A:
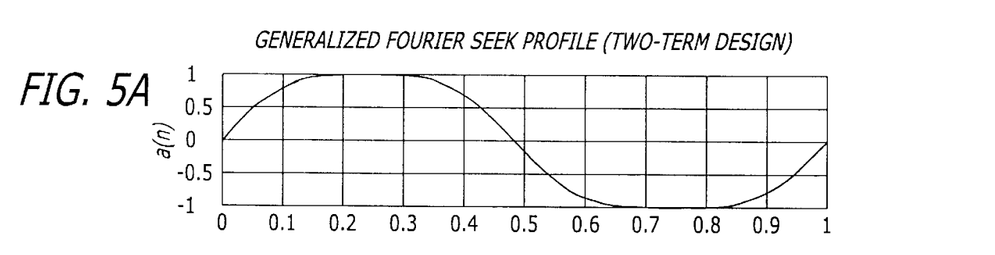
FIGS. 5A through 5C show graphs of the acceleration, velocity, and position trajectories of the two-term generalized Fourier seek method using the tuned coefficient in Table 1.
Figure 5B:
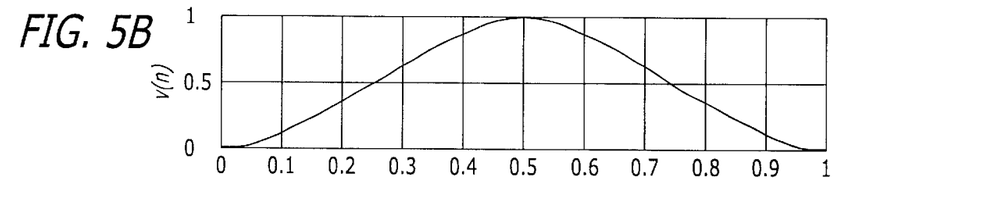
Figure 5C:
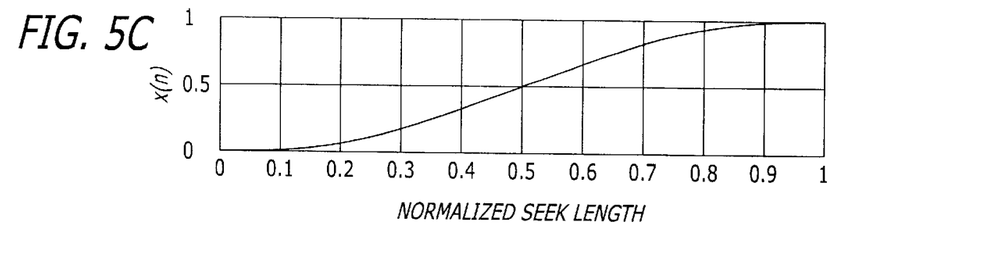

FIGS. 5A through 5C show graphs of the acceleration, velocity, and position trajectories of the two-term generalized Fourier seek method using 0.3750 for the tuned coefficient $F_3$. As seen in FIG. 5A, the two-term generalized Fourier seek method provides fast current rise and fall times, and remains flat at the highest and lowest points without oscillations.

Figure 6A:
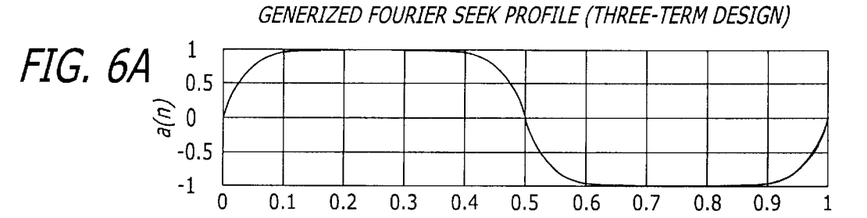
FIGS. 6A through 6C show graphs of the acceleration, velocity, and position trajectories of the three-term generalized Fourier seek method using the tuned coefficient in Table 1.
Figure 6B:
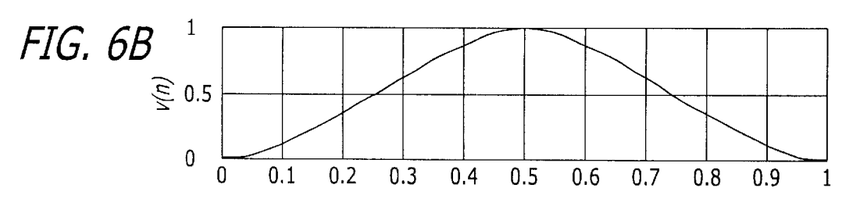
Figure 6C:
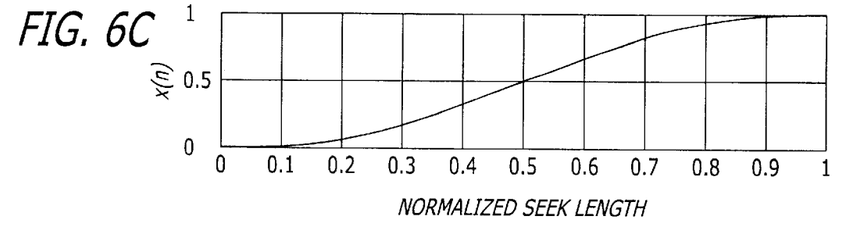

FIGS. 6A through 6C show graphs of the acceleration, velocity, and position trajectories of the three-term generalized Fourier seek method using the tuned coefficient in Table 1. As shown in FIG. 6A, the three-term generalized Fourier seek method provides even faster rise and fall times. The trajectories for both the two-term and three-term methods are very smooth for good servo control.

For performance optimization purposes, it may be advantageous to provide trajectories with a non-unity ratio of acceleration and deceleration duration. The seek times (in samples) for acceleration, coast, and deceleration modes, and the seek time for non-coast mode are denoted by $N_{SK}^A$, $N_{SK}^C$, $N_{SK}^D$, and $N_{SK}^M$. Additionally, the seek lengths (in samples) for acceleration, coast, and deceleration modes, and the seek length for non-coast mode are denoted by $X_{SK}^A$, $X_{SK}^C$, $X_{SK}^D$, and $X_{SK}^M$. Using the new notations, the following relations become clear:

$$N_{SK}=N_{SK}^A+N_{SK}^C+N_{SK}^D=N_{SK}^M+N_{SK}^C, \text{ and} \tag{37}$$

$$X_{SK}=X_{SK}^A+X_{SK}^C+X_{SK}^D=X_{SK}^M+X_{SK}^C. \tag{38}$$

The development of the following equations uses only half a cycle of a sinusoidal wave. In the following, the variable $\xi$ denotes the ratio of acceleration mode in the non-coast seek duration. Thus, $1-\xi$ denotes the ratio of deceleration mode. In the case where $\xi$ is 0.5, the following equations reduce to the previous symmetric equations. The variable $\delta$ is introduced to represent the duration ratio of acceleration mode to deceleration mode, as given by the following expression:

$$\delta = \frac{\xi}{1-\xi}. \tag{39}$$

For the acceleration mode, the seek trajectories become:

$$a(n) = \frac{\pi X_{ACC}}{\gamma (N_{SK}^A)^2 T_S^2}\left[\sin\left(\frac{\pi}{N_{SK}^A}n\right) + \frac{F_3}{3}\sin\left(\frac{\pi}{N_{SK}^A}3n\right) + \frac{F_5}{5}\sin\left(\frac{\pi}{N_{SK}^A}5n\right)\right], \tag{40}$$

$$n < N_{SK}^A$$

$$v(n) = \frac{X_{ACC}}{\gamma N_{SK}^A T_S}\left\{\begin{array}{l}\left[1-\cos\left(\frac{\pi n}{N_{SK}^A}\right)\right] + \frac{F_3}{3^2}\left[1-\cos\left(\frac{\pi}{N_{SK}^A}3n\right)\right] + \ldots \\ \frac{F_5}{5^2}\left[1-\cos\left(\frac{\pi}{N_{SK}^A}5n\right)\right]\end{array}\right\}, \tag{41}$$

$$\text{and } x(n) = \frac{X_{ACC}}{\gamma N_{SK}^A}(X_{1n}+X_{2n}+X_{3n})$$

where, $$X_{1n} = n - \frac{N_{SK}^A}{\pi}\sin\left(\frac{n\pi}{N_{SK}^A}\right), \tag{42}$$

$$X_{2n} = \frac{F_3}{3^2}\left[n - \frac{N_{SK}^A}{3\pi}\sin\left\{\frac{\pi}{N_{SK}^A}3n\right\}\right], \text{ and}$$

$$X_{3n} = \frac{F_5}{5^2}\left[n - \frac{N_{SK}^A}{5\pi}\sin\left(\frac{\pi}{N_{SK}^A}5n\right)\right].$$

For the deceleration mode, the seek trajectories are as follows:

$$a(n)=0, \tag{43}$$

$$v(n)=V_{MAX}, \text{ and} \tag{44}$$

$$x(n)=X_{ACC}+V_{MAX}T_S(n-N_{SK}^A), \text{ where}$$

$$(N_{SK}^A<_n<N_{SK}^A+N_{SK}^C) \tag{45}$$

For the deceleration mode, the seek trajectories are $$a(n) = -\frac{\pi\delta}{\gamma}\left[\frac{X_{ACC}}{(N_{SK}^A)^2 T_S^2}\right](A_{1n}+A_{2n}+A_{3n}),$$

where, $$A_{1n} = \sin\left[\frac{\pi}{N_{SK}^D}(n-N_{SK}^A-N_{SK}^C)\right], \tag{46}$$

$$A_{2n} = \frac{F_3}{3}\sin\left[\frac{3\pi}{N_{SK}^D}(n-N_{SK}^A-N_{SK}^C)\right], \text{ and}$$

$$A_{3n} = \frac{F_5}{5}\sin\left[\frac{5\pi}{N_{SK}^D}(n-N_{SK}^A-N_{SK}^C)\right],$$

$$v(n) = \frac{1}{\gamma}\frac{X_{ACC}}{N_{SK}^A T_S}(2\gamma-V_{1n}-V_{2n}-V_{3n}),$$

where $$V_{1n} = 1-\cos\left[\frac{\pi}{N_{SK}^D}(n-N_{SK}^A-N_{SK}^C)\right], \tag{47}$$

$$V_{2n} = \frac{F_3}{3^2}\left\{1-\cos\left[\frac{3\pi}{N_{SK}^D}(n-N_{SK}^A-N_{SK}^C)\right]\right\}, \text{ and}$$

$$V_{3n} = \frac{F_5}{5^2}\left\{1-\cos\left[\frac{5\pi}{N_{SK}^D}(n-N_{SK}^A-N_{SK}^C)\right]\right\}, \text{ and}$$

$$x(n) = X_{ACC}+X_{CST}+\frac{X_{ACC}}{\gamma N_{SK}^A}(X_{1n}+X_{2n}+X_{3n}),$$

where $$X_{1n} = (n-N_{SK}^A-N_{SK}^C)-\frac{N_{SK}^D}{\pi}\sin\left[\frac{\pi}{N_{SK}^D}(n-N_{SK}^A-N_{SK}^C)\right],$$

$$X_{2n} = \frac{F_3}{3^2}\left\{(n-N_{SK}^A-N_{SK}^C)-\frac{N_{SK}^D}{3\pi}\sin\left[\frac{3\pi}{N_{SK}^D}(n-N_{SK}^A-N_{SK}^C)\right]\right\}, \text{ and}$$

$$X_{3n} = \frac{F_5}{5^2}\left\{(n-N_{SK}^A-N_{SK}^C)-\frac{N_{SK}^D}{5\pi}\sin\left[\frac{5\pi}{N_{SK}^D}(n-N_{SK}^A-N_{SK}^C)\right]\right\}$$

for $$(N_{SK}^A+N_{SK}^C<_n<N_{SK}). \tag{48}$$

The following boundary conditions for seeking are satisfied automatically.

$$a(N_{SK}^A+N_{SK}^C)=0,$$

$$a(N_{SK})+0,$$

$$v(N_{SK}^A+N_{SK}^C) = \frac{2X_{ACC}}{N_{SK}^A T_S},$$

$$V(N_{SK})=0,$$

$$x(N_{SK})=X_{ACC}+X_{CST}+X_{DEC}. \tag{49}$$

Because the extended model uses half-cycle waves for either acceleration mode or deceleration mode, the relationship between seek time and seek length becomes the following:

$$2X_{SK}^A = \frac{\beta}{2\pi} K_T (I_{ACC}(2T_{SK}^A))^2$$

$$2X_{SK}^D = \frac{\beta}{2\pi} K_T (I_{DEC}(2T_{SK}^D))^2$$

Since the seek length should satisfy $X_{SK} = X_{SK}^A + X_{SK}^D$, the combined seek time (excluding coast mode) turns out to be:

$$T_{SK} = \frac{1}{\sqrt{2\xi}} \sqrt{\frac{2\pi X_{SK}}{\beta K_T I_{ACC}}} \quad (50)$$

This equation implies that if the duration ratio between acceleration and deceleration modes is not unity, the seek time will vary. Table 3 shows an exemplary comparison table.

TABLE 3

| $\xi$ | $1/\sqrt{(2\xi)}$ |
|---|---|
| 0.30 | 1.2910 |
| 0.35 | 1.1952 |
| 0.40 | 1.1180 |
| 0.45 | 1.0541 |
| 0.50 | 1.0000 |
| 0.55 | 0.9535 |
| 0.60 | 0.9129 |

It can be proven that the ratio of acceleration duration to deceleration duration is exactly the ratio of maximum deceleration current to maximum acceleration current as shown by the following:

$$\delta = \frac{I_{DEC}}{I_{ACC}}. \quad (51)$$

Equation (51) together with equation (39) state that the longer the acceleration (deceleration) duration, the smaller the maximum acceleration (deceleration) current, and vice versa.

Figure 7A:
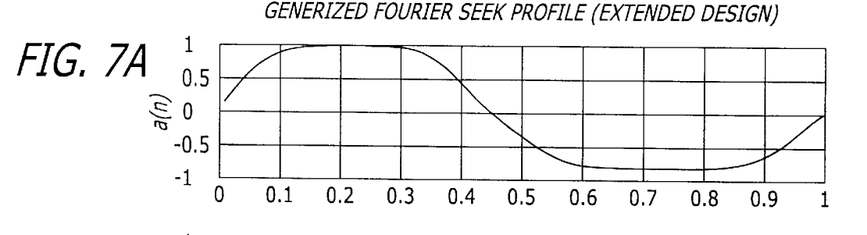
FIGS. 7A through 7C show graphs of the acceleration, velocity, and position trajectories of the two-term generalized Fourier seek method using the extended algorithm, where $\xi$ is equal to 0.45.
Figure 7B:
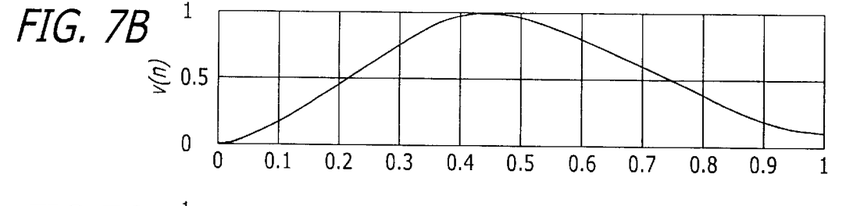
Figure 7C:
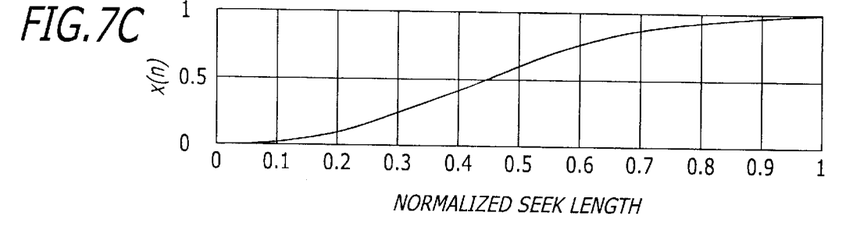

FIGS. 7A through 7C show graphs of the acceleration, velocity, and position trajectories of the two-term generalized Fourier seek method using the extended algorithm, where $\xi$ is equal to 0.45. This illustration yields a 5.4% slower moving time, where the seek time is composed of moving time and settling time. Generally, a reason for using $\xi < 0.5$ is for improving settling time. The issue of settling time versus moving time is a typical design trade off consideration.

The present invention provides a seek routine wherein the transducer is moved in a trajectory using a generalized Fourier seek method with tuned coefficients, and a servo control loop that corrects the input current so that the transducer moves in a desired path.

The present invention may be implemented as a method, apparatus, system, etc. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk which has a surface;
   a spindle motor that rotates said disk;
   a transducer which can write information onto said disk and read information from said disk;
   an actuator arm that can move said transducer across said surface of said disk; and,
   a controller that controls said actuator arm to move said transducer across said disk surface using a generalized Fourier series seek acceleration trajectory having at least two terms, said controller performs a servo routine including determining an actual position of said transducer, computing a design position of said transducer, and generating a position correction value that is a function of said actual and design positions, determining an actual velocity of said transducer, computing a design velocity of said transducer, and generating a velocity correction value that is a function of said position correction value, said design velocity, and said actual velocity, said position correction value and said velocity correction value being used to vary the movement of said transducer.

2. The hard disk drive of claim 1, wherein said generalized Fourier series seek acceleration trajectory includes at least one tuned coefficient that is determined empirically.

3. The hard disk drive of claim 1, wherein said controller controls said actuator arm to move said transducer across said disk surface using a two-term generalized Fourier series seek acceleration trajectory having a tuned coefficient.

4. The hard disk drive of claim 1, wherein said controller controls said actuator arm to move said transducer across said disk surface using a three-term generalized Fourier series seek acceleration trajectory having two tuned coefficients.

5. The hard disk drive of claim 1, wherein said controller is a digital signal processor.

6. The hard disk drive of claim 2, wherein said digital signal processor controls said actuator arm in accordance with a linear interpolation algorithm.

7. The hard disk drive of claim 1, wherein said servo routine includes determining an actual acceleration of said transducer, computing a design acceleration of said transducer, and generating an acceleration correction value that is a function of said velocity correction value, said design acceleration, and said actual acceleration, said acceleration correction value being used to vary the movement of said transducer.

8. The hard disk drive of claim 7, wherein said acceleration correction value is also a function of a feedforward acceleration value provided in a feedforward control loop.

9. The hard disk drive of claim 7, wherein said design position, said design velocity, and said design acceleration are computed from a recursive sine wave generation algorithm.

10. The hard disk drive of claim 1, wherein the trajectory includes a period wherein said transducer has an essentially zero acceleration.

11. The hard disk drive of claim 1, wherein the generalized Fourier series seek acceleration trajectory has an acceleration period and a deceleration period, wherein the acceleration period is unequal to the deceleration period.

12. The hard disk drive of claim 1, wherein said position correction value is a function of a proportional plus integral control algorithm.

13. The hard disk drive of claim 1, wherein said velocity correction value is a function of a proportional plus integral control algorithm.

14. A method for moving a transducer across a surface of a disk, comprising:
   computing a design position of a transducer;
   determining an actual position of the transducer;
   computing a position correction value from the design and actual positions;
   computing a design velocity of the transducer;
   determining an actual velocity of the transducer;
   computing a velocity correction value from the design velocity, the actual velocity, and the position correction value; and
   moving a transducer across the disk surface in accordance with the position correction value, the velocity correction value and a generalized Fourier series seek acceleration trajectory having one or more tuned coefficients.

15. The method of claim 14, wherein moving said transducer comprises moving said transducer across the disk surface in accordance with said generalized Fourier series seek acceleration trajectory having one or more tuned coefficients that are determined empirically.

16. The method of claim 14, wherein moving said transducer comprises moving said transducer across the disk surface in accordance with a two-term generalized Fourier series seek acceleration trajectory having a tuned coefficient.

17. The method of claim 14, wherein moving said transducer comprises moving said transducer across the disk surface in accordance with a three-term generalized Fourier series seek acceleration trajectory having two tuned coefficients.

18. The method of claim 14, further comprising computing a design acceleration of the transducer, determining an actual acceleration of the transducer, computing an acceleration correction value from the design acceleration, the actual acceleration, and the velocity correction value, and varying the movement of the transducer with the acceleration correction value.

19. The method of claim 18, wherein the design acceleration, the design velocity, and the design position are computed with a linear interpolation algorithm for any seek length.

20. The method of claim 14, wherein the generalized Fourier series seek acceleration trajectory includes a period wherein the transducer has an essentially zero acceleration.

21. The method of claim 14, wherein the generalized Fourier series seek acceleration trajectory has an acceleration period and a deceleration period, wherein the acceleration period is unequal to the deceleration period.

22. A computer program product, comprising: a computer usable medium having computer program code embodied therein to excite an actuator arm that is coupled to a transducer to compute a design position of the transducer, determine an actual position of the transducer, compute a position correction value from the design and actual positions, compute a design velocity of the transducer, determine an actual velocity of the transducer, compute a velocity correction value from the design velocity, the actual velocity, and the position correction value so that the transducer moves across a disk surface in accordance with the position correction value, the velocity correction value and a generalized Fourier series seek acceleration trajectory having at least two functions.

23. The computer program product of claim 22, wherein the computer readable program code to excite said actuator arm comprises computer readable program code to excite said actuator arm that is coupled to the transducer so that the transducer moves across the disk surface in accordance with said generalized Fourier series seek acceleration trajectory having at least one tuned coefficient that is determined empirically.

24. The computer program product of claim 22, wherein the computer readable program code to excite said actuator arm comprises computer readable program code to excite said actuator arm that is coupled to the transducer so that the transducer moves across the disk surface in accordance with a two-function generalized Fourier series seek acceleration trajectory having a tuned coefficient.

25. The computer program product of claim 22, wherein the computer readable program code to excite said actuator arm comprises computer readable program code to excite said actuator arm that is coupled to the transducer so that the transducer moves across the disk surface in accordance with a three-function generalized Fourier series seek acceleration trajectory having two tuned coefficients.

26. The computer program product of claim 22, further comprising computer readable program code to compute a design acceleration of the transducer, determine an actual acceleration of the transducer, compute an acceleration correction value from the design acceleration, the actual acceleration, and the velocity correction value, and vary the movement of the transducer with the acceleration correction value.

27. A method for moving a transducer across a surface of a disk, comprising:
   moving the transducer across the disk surface;
   computing a design position of the transducer;
   determining an actual position of the transducer;
   generating a position correction value that is a function of the design position and the actual position;
   computing a design velocity of the transducer;
   determining an actual velocity of the transducer;
   generating a velocity correction value that is a function of the design velocity, the actual velocity and the position correction value;
   computing a design acceleration of the transducer using a generalized Fourier series seek acceleration trajectory that includes one or more tuned coefficients;
   determining an actual acceleration of the transducer;
   generating a feedforward acceleration value that is a function of the actual acceleration value;
   generating an acceleration correction value that is a function of the velocity correction value, the feedforward acceleration value and the design acceleration; and,
   varying the movement of the transducer in response to the generation of the acceleration correction value.

28. The method of claim 27, wherein computing the design acceleration of the transducer comprises computing the design acceleration of the transducer using a generalized Fourier series seek acceleration trajectory that includes one or more tuned coefficients that are determined empirically.

29. The method of claim 27, wherein computing the design acceleration comprises computing the design acceleration of the transducer using a two-term generalized Fourier series seek acceleration trajectory that includes a tuned coefficient.

30. The method of claim 27, wherein computing the design acceleration comprises computing the design acceleration of the transducer using a three-term generalized Fourier series seek acceleration trajectory that includes a two tuned coefficients.

31. The method of claim 27, wherein the position correction value and the velocity correction value are computed with a proportional plus integral control algorithm.

32. The method of claim 27, wherein the design acceleration, the design velocity and the design position are computed with a recursive sine wave generation algorithm.

33. The method of claim 27, wherein the design acceleration, the design velocity and the design position are computed with a linear interpolation algorithm.

* * * * *